(12) United States Patent
Foebel et al.

(10) Patent No.: US 10,409,801 B2
(45) Date of Patent: Sep. 10, 2019

(54) VALIDATION OF WEB-BASED DATABASE UPDATES

(71) Applicants: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(72) Inventors: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(73) Assignee: SAP SE, Walldorf (DE)

(*) Notice: Subject to any disclaimer, the term of this patent is extended or adjusted under 35 U.S.C. 154(b) by 887 days.

(21) Appl. No.: 14/318,853

(22) Filed: Jun. 30, 2014

(65) Prior Publication Data

US 2015/0149421 A1    May 28, 2015

Related U.S. Application Data

(60) Provisional application No. 61/908,710, filed on Nov. 25, 2013.

(51) Int. Cl.
*G06F 16/23* (2019.01)
*H04L 12/26* (2006.01)
*G06F 16/21* (2019.01)
*G06F 16/215* (2019.01)
*G06F 16/951* (2019.01)
*G06F 11/36* (2006.01)
(Continued)

(52) U.S. Cl.
CPC ...... *G06F 16/2365* (2019.01); *G06F 11/3668* (2013.01); *G06F 16/21* (2019.01); *G06F 16/215* (2019.01); *G06F 16/951* (2019.01); *H04L 43/10* (2013.01); *H04L 63/083* (2013.01); *H04L 67/02* (2013.01); *G06F 21/6218* (2013.01); *H04L 63/08* (2013.01)

(58) Field of Classification Search
CPC ........... G06F 11/3668; G06F 17/30289; G06F 17/30303; G06F 17/30371; G06F 17/30864; G06F 16/951; G06F 16/2365; G06F 16/21; G06F 16/215
See application file for complete search history.

(56) References Cited

U.S. PATENT DOCUMENTS

6,560,598 B2 * 5/2003 Delo ................. G06F 17/30371
707/700
7,366,727 B2 * 4/2008 Heusermann ....... G06F 16/1767
707/690
(Continued)

*Primary Examiner* — Hasanul Mobin
(74) *Attorney, Agent, or Firm* — Buckley, Maschoff & Talwalkar, LLC (57) ABSTRACT

A system includes reception of a request to modify the data of a database, the request including first data, execution of processing to fulfill the request, determination, during execution of the processing, that a validation exit is associated with a current state of the processing, storage of the first data in a local temporary table in response to the determination, passage of the local temporary table to the validation exit, and execution of the validation exit to validate the first data based on the local temporary table and on the data of the database.

17 Claims, 5 Drawing Sheets

(51) Int. Cl.
  *H04L 29/06* (2006.01)
  *H04L 29/08* (2006.01)
  *G06F 21/62* (2013.01)

(56) References Cited

U.S. PATENT DOCUMENTS

| | | | | |
|---|---|---|---|---|
| 8,478,850 B2* | 7/2013 | Delany | | G06F 9/542 |
| | | | | 709/223 |
| 8,700,608 B2* | 4/2014 | Belknap | | G06F 16/24542 |
| | | | | 707/719 |
| 2004/0070566 A1* | 4/2004 | Ashton | | G06F 3/03543 |
| | | | | 345/156 |
| 2004/0093599 A1* | 5/2004 | Reynaud | | G06F 21/10 |
| | | | | 717/177 |
| 2007/0136809 A1* | 6/2007 | Kim | | G06F 21/552 |
| | | | | 726/22 |
| 2008/0189549 A1* | 8/2008 | Hughes | | G06F 21/10 |
| | | | | 713/171 |
| 2008/0208918 A1* | 8/2008 | Yang | | G06F 16/283 |
| 2009/0327411 A1* | 12/2009 | Dang | | H04L 63/123 |
| | | | | 709/203 |
| 2011/0225107 A1* | 9/2011 | Khosravy | | G06Q 10/10 |
| | | | | 706/12 |
| 2012/0191735 A1* | 7/2012 | Duff | | G06F 17/30303 |
| | | | | 707/756 |
| 2012/0203744 A1* | 8/2012 | Mercer | | G06F 9/54 |
| | | | | 707/687 |
| 2012/0246334 A1* | 9/2012 | Yang | | H04L 69/08 |
| | | | | 709/232 |
| 2013/0191815 A1* | 7/2013 | Davis | | G06F 9/45508 |
| | | | | 717/129 |
| 2013/0198223 A1* | 8/2013 | Ahmed | | G06F 16/2365 |
| | | | | 707/769 |
| 2013/0198238 A1* | 8/2013 | Ahmed | | G06F 7/00 |
| | | | | 707/796 |
| 2014/0129511 A1* | 5/2014 | Bramel | | G06F 21/6218 |
| | | | | 707/600 |

* cited by examiner

VALIDATION OF WEB-BASED DATABASE UPDATES

CROSS REFERENCE TO RELATED APPLICATIONS

This application claims benefit to and priority of U.S. Patent Application Ser. No. 61/908,710, filed Nov. 25, 2013, the contents of which are hereby incorporated by reference in their entirety for all purposes.

BACKGROUND

According to conventional Web-based architectures, a client application (e.g., a Web browser) requests information from a Web server, the Web server retrieves the information from a database system (e.g., via an intermediate application server), and the Web server provides the information to the client application.

Open Data Protocol (OData) is a resource-based Web protocol for querying and updating data. Accordingly, a Web-based client may use the OData protocol to create, update and delete data stored in a database system, as long as the database system (and/or an intermediate application server) supports the OData protocol. However, changes to a database typically require validation, which is a function that is not provided by the OData protocol. Moreover, such validation may require access to and manipulation of current database data.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
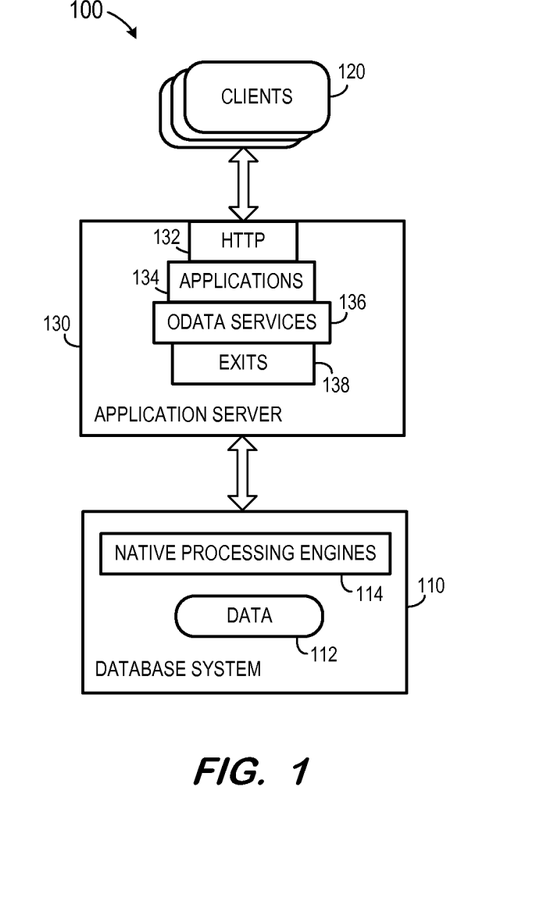
FIG. 1 is a block diagram of a system according to some embodiments.

FIG. 1 is a block diagram of system 100 according to some embodiments. System 100 includes database system 110, clients 120, and application server 130. Generally, application server 130 receives queries from clients 120 and provides results to clients 120 based on data of database system 110. Database system 110 and application server 130 may support multi-tenancy to separately support multiple unrelated clients by providing multiple logical database systems which are programmatically isolated from one another.

Database system 110 implements an "in-memory" database, in which data 112 represents a full database stored in volatile (e.g., non-disk-based) memory (e.g., Random Access Memory). The full database may be persisted in and/or backed up to fixed disks (not shown). Embodiments are not limited to an in-memory implementation. For example, data 112 may be stored in one or more fixed disks (e.g., persistent memory for storing their respective portions of the full database) and accessed during operation when needed.

Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Database system 110 may be distributed among several relational databases, dimensional databases, and/or other data sources. Embodiments are not limited to any number or types of data sources.

In some embodiments, data 112 may comprise one or more of conventional tabular data, row-based data, column-based data, and object-based data. Moreover, data 112 may be indexed and/or selectively replicated in an index to allow fast searching and retrieval thereof.

Database system 110 includes native processing engines 114, for example, for processing SQL statements received from application server 130. An SQL processing engine may perform table joins, etc. which are required to respond to an incoming SQL statement. Native processing engines 114 may include one or more engines for executing any standardized or proprietary scripting language. Such an engine may therefore provide execution of data-intensive application logic within database system 110.

SQL other scripting languages may be implemented using a common infrastructure of built-in data engine functions which have access to various metadata, such as definitions of relational tables, columns, views, and indexes, and definitions of script procedures. Database system 110 may additionally provide a framework for the installation of functional libraries which are integrated with different ones of processing engines 114.

Application server 130 includes HTTP interface 132 through which clients 120 may communicate with application server 130. According to the illustrated embodiment, application server 130 provides a set of embedded system services which support applications 134 executing on server 130. The system services may be used by these server applications 134 to expose the data model of database system 110 to clients 120, including its tables, views and database procedures. In addition to exposing the data model, application server 130 may host system services such as a search service. The system services may also provide a lightweight web server, server-side JavaScript execution and access to SQL and other scripting language functions, and configurable support for OData (i.e., OData services 136).

OData services 136 expose an end point that allows applications 134 to access data 112. OData services 136 implement the OData protocol and map data 112 between its underlying form (e.g., database tables, spreadsheet lists, etc.) and a format that the requesting client can understand.

OData defines an abstract data model and a protocol which, together, enable any client to access data exposed by any data source. The data model provides a generic way to organize and describe data. OData uses the Entity 1 Data Model (EDM).

The OData protocol is a set of interactions which includes the REST-based create, read, update, and delete operations along with an OData-defined query language. OData defines operations on resources using HTTP commands (for example, GET, PUT, POST, and DELETE) and specifies the uniform resource indicator (URI) syntax which is used to identify the resources. The OData service sends data in either in XML-based format defined by Atom/AtomPub or using JavaScript Object Notation (JSON).

Exits 138 may include executable code to provide data validation according to some embodiments. As mentioned above, an OData request is processed by one of applications 134 using OData services 136. One or more of exits 138 may be registered so that the registered exits 138 are called at specified points in the request processing. Once called, a registered exit 138 performs desired validation processing. The validation processing may include using a native processing engine 114 of database system 110 to validate the data based on the subject data and on current data 112 of system 110.

Each of clients 120 may comprise one or more devices executing program code of a software application for presenting user interfaces to allow interaction with application server 130. Presentation of a user interface may comprise any degree or type of rendering, depending on the type of user interface code generated by application server 130. For example, a client 120 may execute a Web Browser to request and receive a Web page (e.g., in HTML format) from application server 130 via HTTP or HTTPS, and may render and present the Web page according to known protocols. One or more of clients 120 may also or alternatively present user interfaces by executing a standalone executable file (e.g., an .exe file) or code (e.g., a JAVA applet) within a virtual machine.

Figure 2:
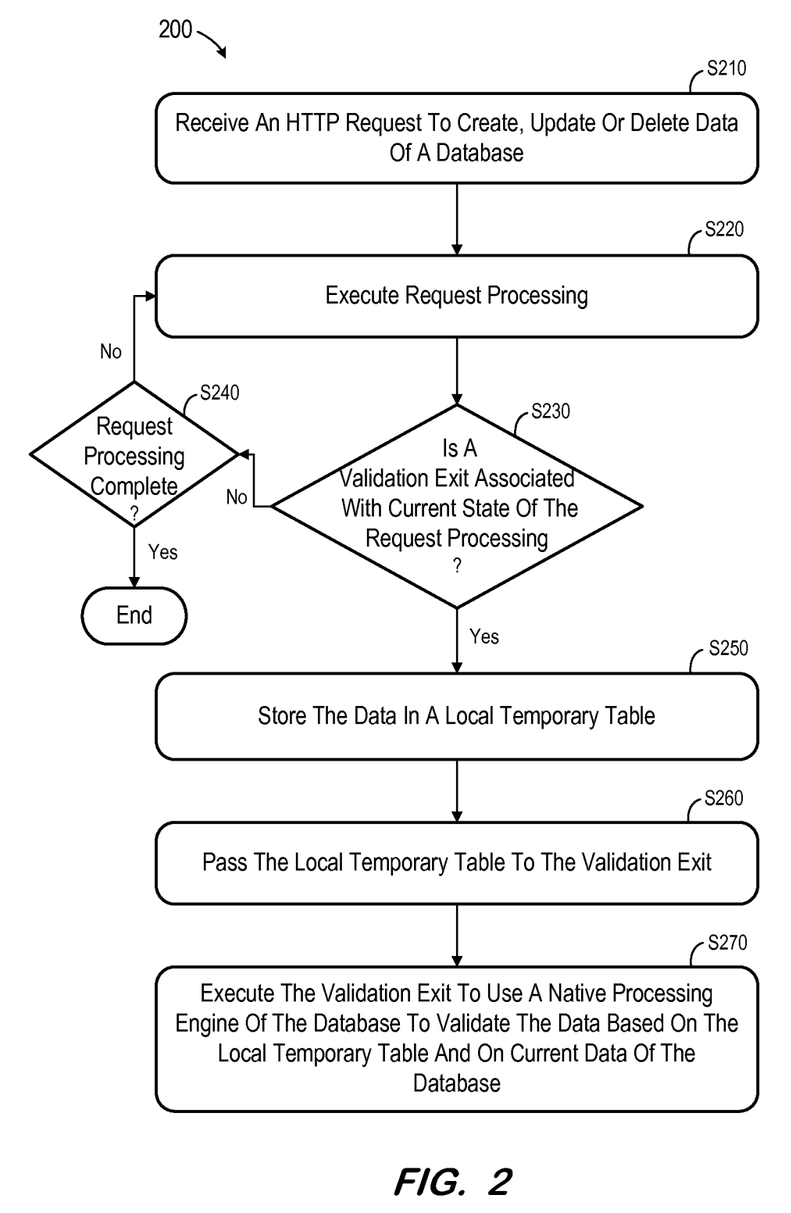
FIG. 2 is a flow diagram of a process according to some embodiments.

FIG. 2 is a flow diagram of process 200 according to some embodiments. All processes mentioned herein may be executed by various hardware elements and/or embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an HTTP request is received at S210. The request may be received from one of clients 120, by an application 134 which supports OData as described above. The HTTP request is a POST, PUT, or DELETE request, which maps, respectively, to an OData Create, Update or Delete request. The request will generally be referred to as a request to modify data. In response to the request, the application 134, in conjunction with OData services 136, begins execution of request processing at S220. For example, in a case that the request received at S210 is a request to insert data, the OData infrastructure may being execution of an INSERT SQL statement at S220.

Next, at S230, it is determined whether a validation exit is associated with a current state of the request processing. The validation exit of S230 is used for validation of input data and data consistency checks. In this regard, some embodiments provide execution of code, or "exits", at defined points of an OData write request. The write request may include create, update, and delete events, and the defined points may include before or after a modification operation, or before or after a commit operation. An exit is registered for a particular event (i.e., create, update or delete) and for a particular processing state ("before", "after", "precommit" or "postcommit").

The following example illustrates JavaScript to create a validation exit that uses a sequence and regular expression for email validation. The validation exit performs validation, performs the insert or update operation, and updates the parameter afterTableName to pass any changes back to the caller.

```
$.import("sap.hana.democontent.epmSP6.services", "session");
var SESSIONINFO =
$.sap.hana.democontent.epmSP6.services.session;
/**
@param {connection} Connection - The SQL connection used in
the OData request
@param {beforeTableName} String - The name of a temporary
table with the single entry before the operation (UPDATE and
DELETE events only)
@param {afterTableName} String -The name of a temporary table
with the single entry after the operation (CREATE and UPDATE
events only)
*/
function usersCreate(param){
    $.trace.debug('entered function');
    let after = param.afterTableName;
    let before = param.beforeTableName;
    let pStmt = param.connection.prepareStatement('select *
from "' + after + '"');
    var User =
SESSIONINFO.recordSetToJSON(pStmt.executeQuery( ), 'Details');
    pStmt.close( );
    if(User.Details[0].E_MAIL=== ''){
        throw 'invalid email for ' +
        User.Details[0].FIRSTNAME + ' E-Mail field must not
        be empty';
    }
    for ( var i = 0; i<2; i++){
        var pStmt;
        if (i<1){
            pStmt =
param.connection.prepareStatement('insert into
SP7DEMO."playground.sp7.data::USER.Details"
values(?,?,?,?)' );
        }else{
            pStmt =
param.connection.prepareStatement('upsert "' + after + '"
values(?,?,?,?) WHERE PERS_NO = ?' );
            pStmt.setString(5, User.Details[0].PERS_NO);
        }
        pStmt.setStringd(1, User.Details[0].PERS_NO);
        pStmt.setString(2, User.Details[0].FIRSTNAME + '
Changed');
        pStmt.setString(3, User.Details[0].LASTNAME);
        pStmt.setString(4, User.Details[0].E_MAIL);
        pStmt.executeUpdate( );
        pStmt.close( );
    }
}
```

The following example illustrates registration of an SQL script for an OData update operation. The script verifies, before the execution of the update operation, that the updated value is larger than the previous value. The example includes definition of the table to be updated and of a table type for an error output parameter of the exit procedure.

Initially, a table definition file is created using .hdbtable syntax. The table to expose is defined in sample.odata: table.hdbtable as follows:

```
table.schemaName = "ODATASAMPLES";
table.columns = [{name = "ID"; sqlType = INTEGER; nullable =
false;}];
table.primaryKey.pkcolumns = ["ID"];
```

A table type for the error output parameter of the exit procedure is created. The error type file sample.odata:error.hdbstructure may be defined as follows:

```
table.schemaName = "ODATASAMPLES"
table.columns = [
    {name = "HTTP_STATUS_CODE"; sqlType = INTEGER;},
    {name = "ERROR_MESSAGE"; sqlType = NVARCHAR; length =
100;},
    {name = "DETAIL"; sqlType = NVARCHAR; length = 100;} ];
```

Next, a procedure (i.e., the "exit") is created which runs before the UPDATE event. The script for the before-UPDATE event includes two table input parameters and one output parameter, for example:

```
IN new "sample.odata::table"
IN old "sample.odata::table"
OUT error "sample.data::error"
```

The exit sample.odata:beforeupdate.hdbprocedure may then appear as follows:

```
create procedure "ODATA_TEST"."sample.odata::beforeupdate"
    (IN new "sample.odata::table", IN old
"sample.odata::table", OUT error
sample.odata::error")
language sqlscript
sql security invoker as
    idnew INT;
    idold INT;
begin
    select ID into idnew from :new;
    select ID into idold from :old;
    if :idnew <= :idold then
    error = select 400 as http_status_code,
        'invalid ID' error_message,
        'the new value must be larger than the previous' detail
from dummy;
    end if;
end;
```

The exit to be executed at the "before" event is then registered. The update events (before " . . . ") keywords may be used to register the procedure, as illustrated in the following example of an OData service file:

```
service {
    "sample.odata::table"
        update events (before "sample.odata::
    beforeupdate");
}
```

Returning to process 200, the determination at S230 may include a determination of whether a validation exit is registered for the current state of the request processing. If not, flow proceeds to S240 to determine whether the request processing is complete. If the request processing is not complete, flow cycles back to S220 and continues as described herein.

Flow proceeds from S230 to S250 if it is determined at S230 that a validation exit is associated with a current state of the request processing. At S250, the data of the request (i.e., the data to be inserted in the case of a create event or an update event, or the data to be deleted in the case of a delete event) is stored in a local (i.e., local to application server 130) temporary table. The local temporary table is passed to the validation exit at S260.

Next, at S270, the validation exit is executed. The execution uses a native processing engine of the database system to validate the data based on the local temporary table and on current data of the database system. Since the local temporary table has been passed to the validation exit, the validation exit may call a native processing engine (e.g., SQL) of the database system to retrieve, join and manipulate data of the local temporary table and data 112 of database system.

Flow then returns to S220 to continue execution of the request processing, and to proceed as described above. In this regard, after further request processing, it may be determined that a second validation exit is associated with the current state of the request processing. For example, the previously-executed validation exit may have been registered with the "before" state of the request processing, and the second validation exit is registered with the "after" state.

Flow therefore proceeds as described above to pass the local temporary table to the second validation exit at S260 and to execute the second validation exit at S270. According to some embodiments, S250 is bypassed in a case that the data was previously stored to a local temporary table. Flow continues as described above until it is determined at S240 that the request processing is complete, or until an error is returned by a validation exit executed at S270.

At each state of the request processing (i.e., "before", "after", "precommit" and "postcommit"), the database transaction in which the modification (i.e., create, update, or delete) takes place has a defined state. In the "before" state, the data of the local temporary table is not part of the database (e.g., data 112). In the "after" state and the "precommit" state, the data of the local temporary table is part of the persisted database, but is only visible within the transaction because it has not yet been committed. In the "postcommit" state, the data of the local temporary table is part of the persisted database and visible to all transactions.

According to some embodiments, the request received at S210 comprises a request to create, update or delete more than one data item in the database. Such a request may be considered a batch request. Validation exits are called, if registered, for each state of the request processing for each data item. In some embodiments, in a case that a request is received to update data items (1) and (2), the request processing proceeds as follows: before (1)→(update(1)) →after (1)→before (2)→(update(2))→after (2)→precommit(1)→precommit(2)→(transaction commit)→postcommit (1)→postcommit(2). A "before" validation is therefore called at before (1) and before (2), which are not consecutive states, and a "precommit" validation is called at precommit (1) and precommit(2), which are consecutive.

Figure 3:
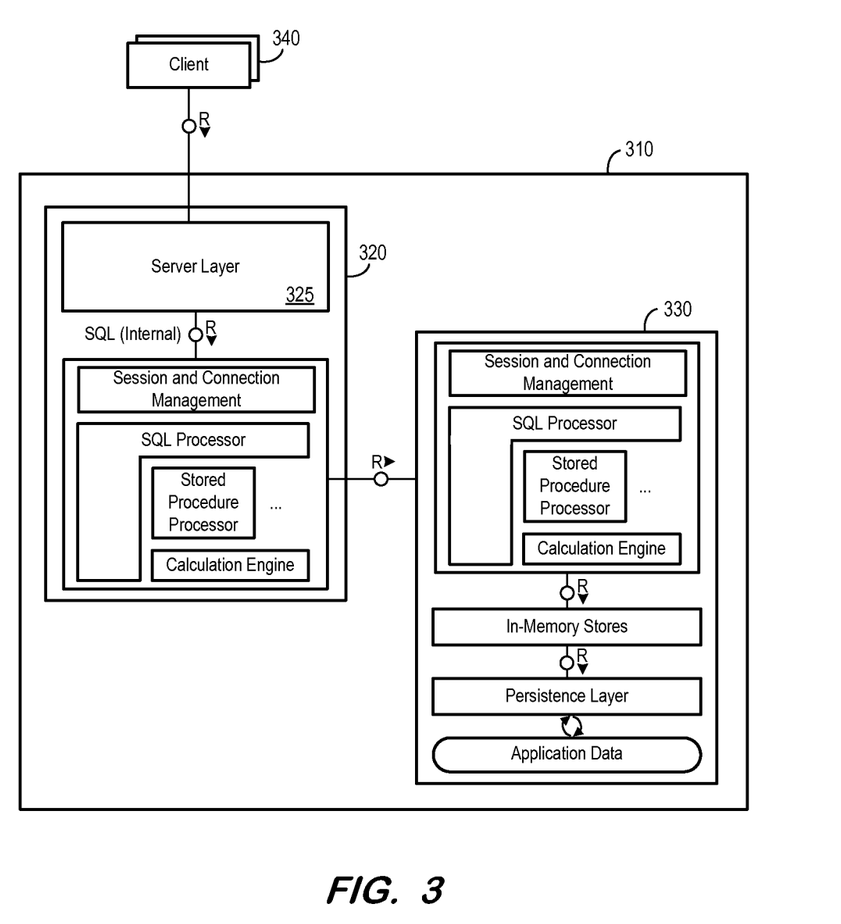
FIG. 3 is a detailed block diagram of an application server according to some embodiments.

FIG. 3 illustrates database platform 310 integrating web application server 320 and index server 330 according to some embodiments. Web application server 320 may enable execution of server applications completely on database platform 310, without the need for an additional application server. Database platform 310 may therefore comprise an implementation of database system 110 and application server 130 of FIG. 1.

Clients 340 send their requests to database platform 310 via HTTP or HTTPS. Clients 340 may be Web browsers, mobile applications, or other applications that consume resources and services provided by server applications. According to some embodiments, the presentation logic is run on clients 340.

Server 320 runs services that accept the HTTP requests and maps them to database queries and stored procedure calls. As described above, the HTTP requests may include OData requests, and the services may include OData services and validation exits. Data-intensive logic may be executed in index server 330 (using SQL, SQLScript, views, L procedures, C++, etc.).

In this regard, web application server 320 can be viewed as an index server with server layer 325 on top. However, according to some embodiments, no application data is stored in Web application server 320 itself. If server layer 325 needs to access tables or views or needs to call a stored procedure, it uses the illustrated internal SQL API to open a local database connection and then sends an SQL statement to the SQL processor in the web application server 320. The statement is processed by the SQL processor or by the calculation engine of web application server 310.

The SQL processor and the calculation engine delegate the execution to the index server 330 which manages the required data. This delegation may be similar to the mechanism used in a distributed database system including multiple index servers. In contrast, however, web application server 320 delegates the execution of database operations because it does not store application tables. Integration of server 320 into database platform 310 may lead to simplified administration and a better development experience.

Figure 4:
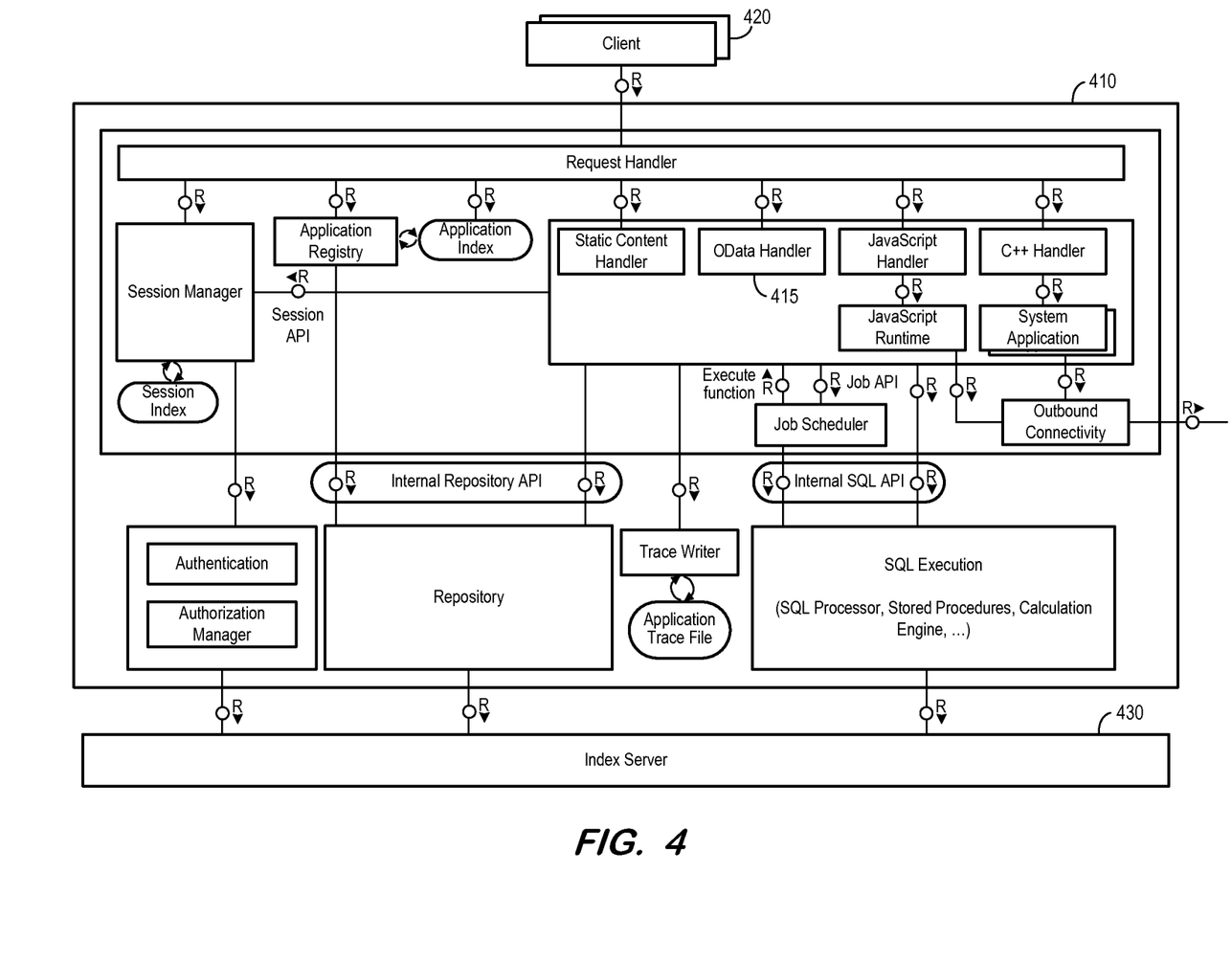
FIG. 4 is a detailed block diagram of a system according to some embodiments.

FIG. 4 is a detailed block diagram of Web application server 410 according to some embodiments. Server 410 may comprise an implementation of application server 130 of FIG. 1, while index server 430 may comprise an implementation of database system 110.

Incoming requests from clients 420 are received by the request handler. The request handler first determines the application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 410 may support several authentication mechanisms, including but not limited to SAML, SAP assertion ticket, SAP logon ticket, Kerberos, X.509 certificates, and user and password using HTTP basic authentication or form-based logon.

After successful authentication, the request handler forwards the request to the responsible resource handler of server 410. FIG. 4 illustrates several different resource handlers for different types of resources.

The static content handler is called for content such as Hypertext Markup Language (HTML) files, client side scripts, or images. The static content handler retrieves the resources from the runtime storage.

OData handler 415 is invoked if the requested resource belongs to an OData service. If the client requests the service definition, OData handler 415 returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON. As explained above, developers may specify application-specific exits, which may be SQLScript procedures, JavaScript functions, etc., to be called for validating OData write requests. In this case, OData handler 415 calls the specified exits at the designated points of the request processing, The JavaScript handler is invoked if the requested resource is a server-side JavaScript program. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 410 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the XS server, which stores it in the database.

Figure 5:
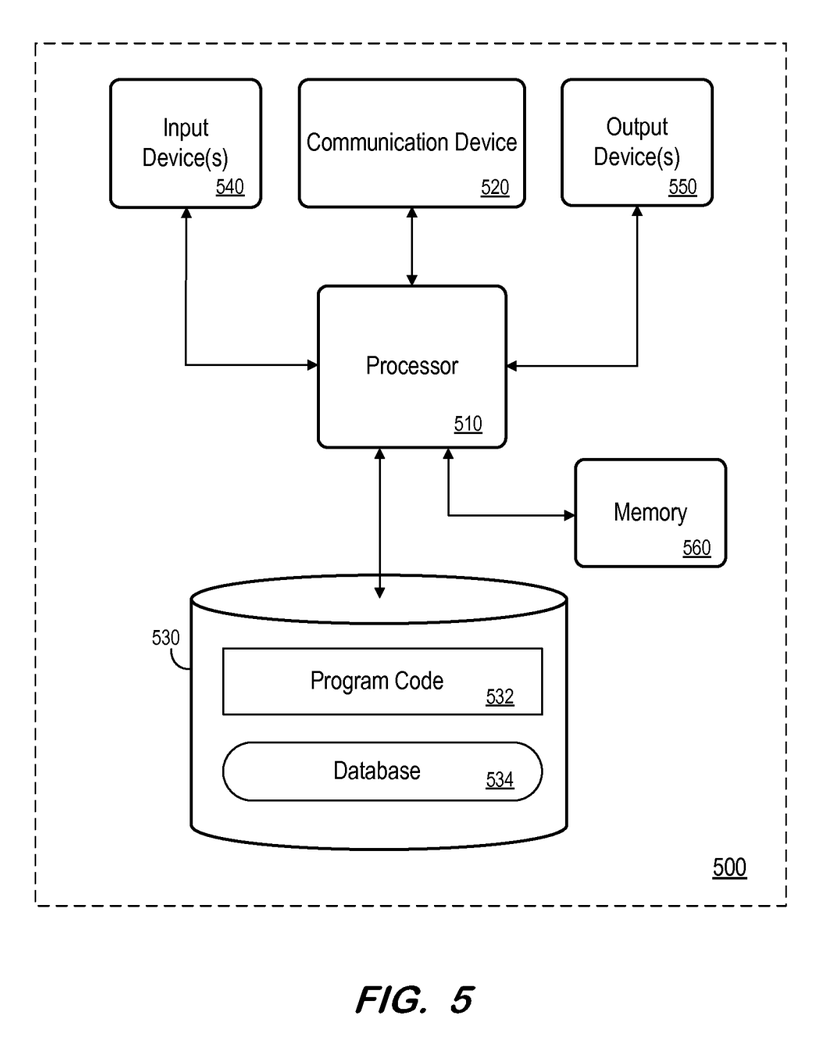
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of application server 130 and database system 110 of FIG. 1 in some embodiments. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Program code 532 may comprise program code executed by processor 510 to cause apparatus 500 to perform any one or more of the processes described herein. Embodiments are not limited to execution of these processes by a single apparatus. Database 534 may include database data as described above. As also described above, database data (either cached or a full database) may be stored in volatile memory such as memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a database storing data; and
a processor to execute processor-executable process steps to cause the system to:
receive an OpenData Protocol (OData) request to modify the data, the request including first data;
execute processing to fulfill the request;
determine, during execution of the processing to fulfill the request to modify the data, that a validation exit including executable code to validate the data to be modified is registered for the modification and for a current state of the processing to fulfill the request to modify the data, wherein the current state is one of before or after the modification operation;
store the first data in a local temporary table in response to the determination that the validation exit is associated with the current state of the processing to fulfill the request to modify the data, wherein the current state is the before state, the data of the local temporary table is not part of the database, and when the current state is the after state, the data of the local temporary table is part of the database;
pass the local temporary table to the validation exit; and
execute the validation exit to validate the first data based on the local temporary table and on the data of the database, wherein execution of the validation exit comprises execution of a join between the local temporary table and one or more tables of the database, and wherein execution of the validation exit includes execution of a native processing engine of the database system to validate the first data.

2. The system according to claim 1, wherein execution of the validation exit comprises:
execution of a join between the local temporary table and one or more tables of the database.

3. The system according to claim 2, wherein execution of the join comprises execution of the join by the native processing engine of the database.

4. The system according to claim 1, wherein the request conforms to Hypertext Transfer Protocol and to OData protocol.

5. The system according to claim 1, wherein determination that the validation exit is associated with a current state of the processing comprises determination of whether the validation exit is registered to the current state of the processing.

6. The system according to claim 1, wherein the processor is further to execute the processor-executable process steps to cause the system to:
determine, during execution of the processing, that a second validation exit is associated with a next state of the processing;
pass the local temporary table to the second validation exit; and
execute the second validation exit to validate the first data based on the local temporary table and on the data of the database.

7. A computer-implemented method comprising:
receiving an Open Data Protocol (OData) request to modify the data of a database, the request including first data;
executing processing to fulfill the request;
determining, during execution of the processing to fulfill the request to modify the data, that a validation exit including executable code to validate the data to be modified is registered for the modification and for a current state of the processing to fulfill the request to modify the data, wherein the current state is one of before or after the modification operation;
storing the first data in a local temporary table in response to the determination that the validation exit is associated with the current state of the processing to fulfill the request to modify the data, wherein when the current state is the before state, the data of the local temporary table is not part of the database, and when the current state is the after state, the data of the local temporary table is part of the database;
passing the local temporary table to the validation exit; and
executing the validation exit to validate the first data based on the local temporary table and on the data of the database, wherein executing the validation exit comprises executing a join between the local temporary table and one or more tables of the database, and wherein execution of the validation exit includes execution of a native processing engine of the database system to validate the first data.

8. The computer-implemented method according to claim 7, wherein executing the join comprises executing the join by the native processing engine of the database.

9. The computer-implemented method according to claim 7, wherein the request conforms to Hypertext Transfer Protocol and to OData protocol.

10. The computer-implemented method according to claim 7, wherein determining that the validation exit is associated with a current state of the processing comprises determining that the validation exit is registered to the current state of the processing.

11. The computer-implemented method according to claim 7, further comprising:
- determining, during execution of the processing, that a second validation exit is associated with a next state of the processing;
- passing the local temporary table to the second validation exit; and
- executing the second validation exit to validate the first data based on the local temporary table and on the data of the database.

12. A non-transitory computer-readable medium storing program code, the program code executable by a computer system to cause to the computer system to:
- receive an OpenData Protocol (OData) request to modify the data of a database, the request including first data;
- execute processing to fulfill the request;
- determine, during execution of the processing to fulfill the request to modify the data, that a validation exit including executable code to validate the data to be modified is registered for the modification and for a current state of the processing to fulfill the request to modify the data, wherein the current state is one of before or after the modification operation;
- store the first data in a local temporary table in response to the determination that the validation exit is associated with the current state of the processing to fulfill the request to modify the data, wherein when the current state is the before state, the data of the local temporary table is not part of the database, and when the current state is the after state, the data of the local temporary table is part of the database;
- pass the local temporary table to the validation exit; and
- execute the validation exit to validate the first data based on the local temporary table and on the data of the database, wherein execution of the validation exit comprises executing a join between the local temporary table and one or more tables of the database, and wherein execution of the validation exit includes execution of a native processing engine of the database system to validate the first data.

13. The medium according to claim 12, wherein execution of the validation exit comprises execution of a join between the local temporary table and one or more tables of the database.

14. The medium according to claim 13, wherein execution of the join comprises execution of the join by the native processing engine of the database.

15. The medium according to claim 12, wherein the request conforms to Hypertext Transfer Protocol and to OData protocol.

16. The medium according to claim 7, wherein determination that the validation exit is associated with a current state of the processing comprises determination of whether the validation exit is registered to the current state of the processing.

17. The medium according to claim 7, wherein the program code is further executable by the computer system to cause to the computer system to:
- determine, during execution of the processing, that a second validation exit is associated with a next state of the processing;
- pass the local temporary table to the second validation exit; and
- execute the second validation exit to validate the first data based on the local temporary table and on the data of the database.

* * * * *